US006834865B1

(12) United States Patent
Lin

(10) Patent No.: US 6,834,865 B1
(45) Date of Patent: Dec. 28, 2004

(54) HORIZONTAL BALANCE CONTROL SYSTEM OF MOTOR VEHICLE

(76) Inventor: Chih-Chin Lin, 1F, No. 154, Nanshan Rd., Chungho City, Taipei Hsien (TW)

( * ) Notice: Subject to any disclaimer, the term of this patent is extended or adjusted under 35 U.S.C. 154(b) by 0 days.

(21) Appl. No.: 10/610,581

(22) Filed: Jul. 2, 2003

(51) Int. Cl.⁷ .............................................. B60G 17/01
(52) U.S. Cl. ............................. 280/5.507; 280/124.106
(58) Field of Search .......................... 280/5.507, 5.506, 280/5.508, 124.1, 124.106, 124.107, 124.158, 124.159

(56) References Cited

U.S. PATENT DOCUMENTS 5,480,188 A * 1/1996 Heyring ............... 280/124.104
6,318,742 B2 * 11/2001 Franzini .............. 280/124.106
6,519,517 B1 * 2/2003 Heyring et al. ................ 701/37
6,669,216 B1 * 12/2003 Elser et al. ........... 280/124.106

* cited by examiner

Primary Examiner—Faye M. Fleming

(57) ABSTRACT

The present invention is to provide a horizontal balance control system of motor vehicle comprising a pneumatic conveyor (or electromagnetic device) operable to actuate hydraulic devices, links, and other mechanical elements for generating a restraint force among wheels in the same line or not in the same line, a control means is operable to activate the pneumatic conveyor for outputting compressed gas to increase pressure of a valve thereof and enable wheels in the same line or not in the same line to rotate toward the same direction. By utilizing this, discomfort of a driver and one or more passengers due to moving forward or backward while the motor vehicle is braking or accelerating is eliminated.

6 Claims, 5 Drawing Sheets

US 6,834,865 B1

HORIZONTAL BALANCE CONTROL SYSTEM OF MOTOR VEHICLE

FIELD OF THE INVENTION

The present invention relates to a suspension system of motor vehicle and more particularly to a horizontal balance control system of motor vehicle with improved characteristics.

BACKGROUND OF THE INVENTION

Conventionally, a car may shock strongly while running on a straight but rough road due to unevenness of road surface. An independent suspension system of wheels may lessen the effect of shocks and thus brings a degree of comfort to a driver and passenger(s). It is understood that the car body will incline slightly while a car is making a turn. The car will run forward a short distance after pressing the brake suddenly due to inertia. Further, driver and passenger(s) in the car will move backward suddenly while accelerating. At this time, the above undesirable effect can be substantially eliminated if there is a good restraint among wheels. As an end, the car can maintain a state of balance, the effect of shocks and jarring can be lessened to a minimum, the maneuverability of the car can be increased, driving safety can be greatly improved, and road conditions of straight roads and curve roads can be equally considered. However, it is impossible of eliminating the above effect by the current suspension system. It is known that shocks and jarring of a running car may bring a degree of discomfort to driver and passenger(s), cause one or more wheels to slightly suspend in the air, decrease maneuverability of the car, reduce output torque, and adversely affect driving safety. Hence, a good transmission system of a car can be compromised if a suspension system (including links, springs, shock absorbers, and anti-inclination bars) thereof is poor.

As designed, a shock absorber is adapted to prevent a resonance from occurring on springs and increase a shock absorbing capability of a car. For effectively absorbing shocks of road surface, typical springs having a high degree of softness are preferred. However, it is also desirable to employ strong springs in the car for accommodating the condition of making a turn. Otherwise, the car may incline significantly. Moreover, an anti-inclination bar is adapted to decrease the inclination of a car while making a turn and increase the restraint of two axles in the same line. However, an increase of the restraint can adversely affect a degree of comfort of driver and passenger(s) while driving. In other words, they are contradictory.

Thus, it is desirable to provide a novel horizontal balance control system of motor vehicle in order to overcome the above drawbacks of the prior art.

SUMMARY OF THE INVENTION

An object of the present invention is to provide a horizontal balance control system of motor vehicle comprising a pneumatic conveyor (or electromagnetic device) operable to actuate hydraulic devices, links, and other mechanical elements for generating a restraint force among wheels in the same line or not in the same line. By utilizing this, opposite restraint forces of straight roads and curve roads can be equally considered. Also, inclination, forward movement, and backward movement of the body of motor vehicle caused by making a turn, braking, and accelerating respectively are substantially eliminated. Moreover, forces adapted to various road conditions can be generated, the restraint of wheels can be appropriately controlled, and poor maneuverability of an inclined motor vehicle due to centrifugal force when making a turn is greatly improved. In a case that a motor vehicle is braking or accelerating pressure of first and second valves is increased for enabling wheels in the same line or not in the same line to rotate toward the same direction. At the same time, a control means is operable to activate the pneumatic conveyor for outputting compressed gas to increase pressure of the third valve and enable wheels in the same line or not in the same line to rotate toward the same direction. By utilizing this, discomfort of a driver and one or more passengers due to moving forward or backward while the motor vehicle is braking or accelerating is eliminated. Also, a horizontal balance of the body of the motor vehicle is well maintained. Moreover, various road conditions are considered for minimizing shocks and jarring generated while driving.

The above and other objects, features and advantages of the present invention will become apparent from the following detailed description taken with the accompanying drawings.

DETAILED DESCRIPTION OF THE PREFERRED EMBODIMENTS

Figure 1:
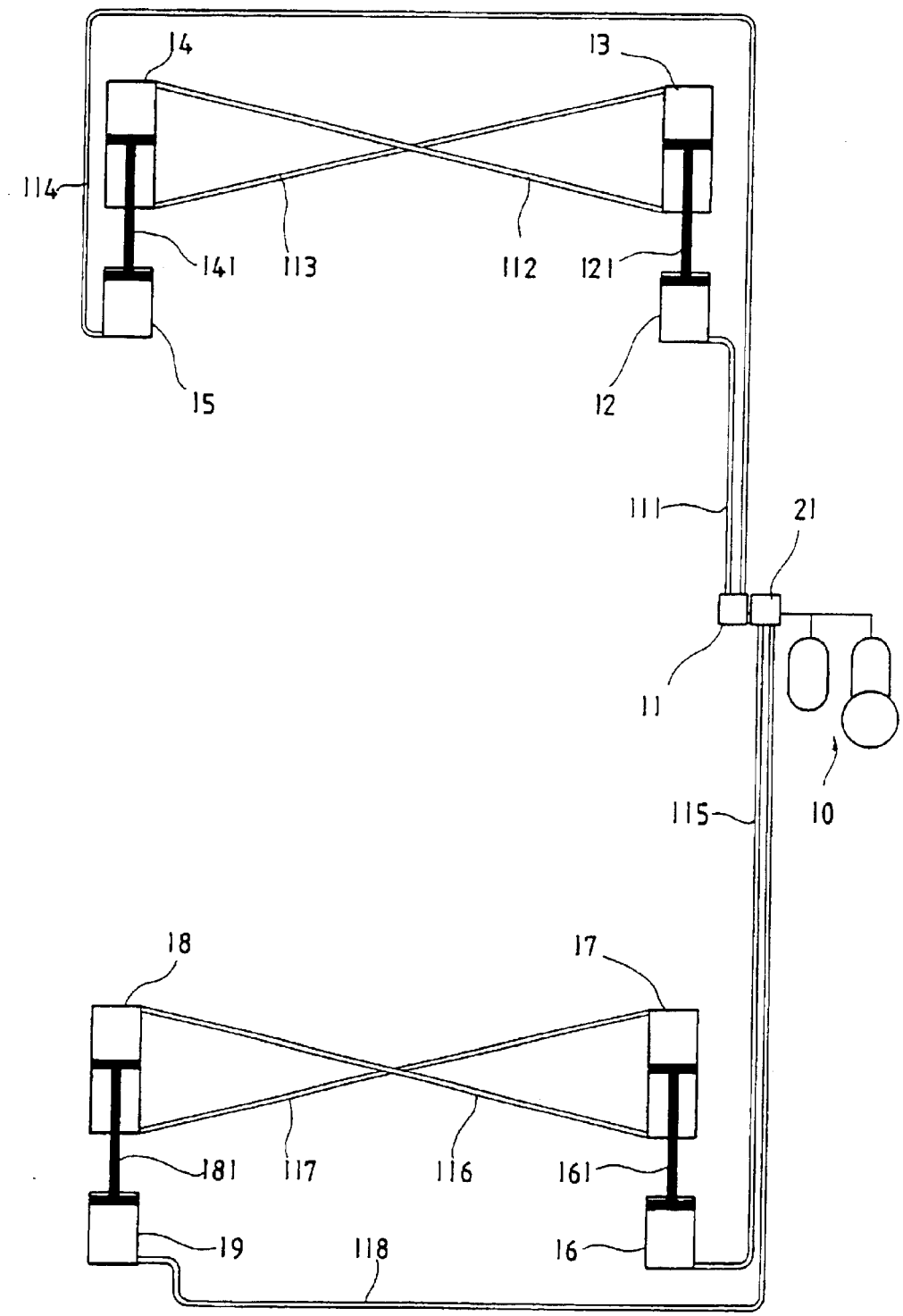
FIG. 1 schematically depicts a first system configuration according to the invention.
Figure 2:
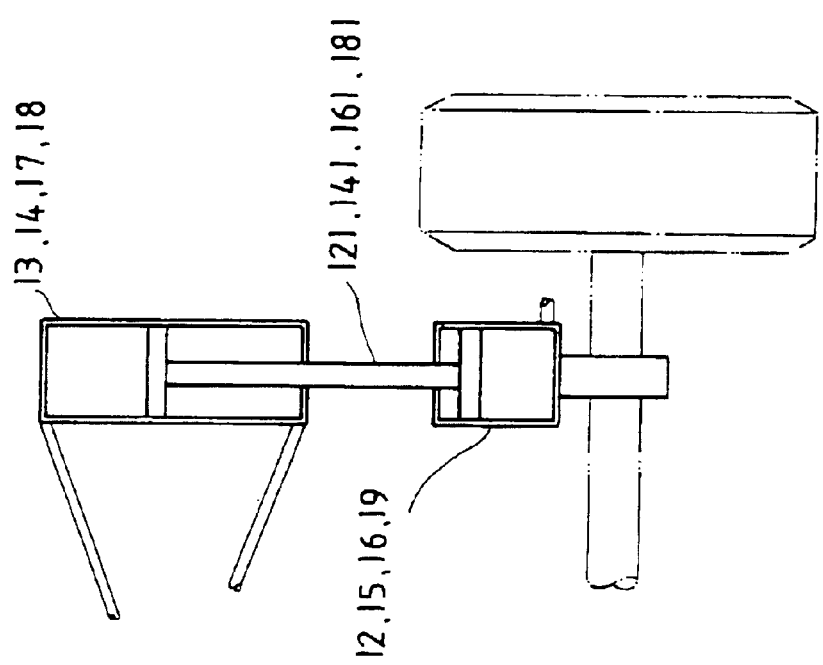
FIG. 2 schematically depicts a portion of structure according to the invention.

Referring to FIGS. 1 and 2, a horizontal balance control system of motor vehicle in accordance with a first configuration of the invention is shown. The system comprises a pneumatic conveyor (or electromagnetic device) 10 which is operable to actuate hydraulic devices, links, and other mechanical elements for enabling wheels in the same line or wheels not in the same line to rotate toward the same direction and thus, overcoming irregularity of road surface. As a result, forces adapted to various road conditions can be generated, the restraint of wheels can be appropriately controlled, and balance of the car can be obtained.

In the invention, the pneumatic conveyor (or electromagnetic device) 10 is mounted in a suitable position of a car At least one first valve 11 and a second valve 21 are provided at one end of the pneumatic conveyor (or electromagnetic device) 10. A first line 111 is interconnected the first valve 11 and a first lower pneumatic cylinder 12. One end of the first lower pneumatic cylinder 12 is coupled to a front right wheel suspension device (see FIG. 2). The first lower pneumatic cylinder 12 comprises an extended first piston 121 coupled to a first upper hydraulic cylinder 13. Hydraulic fluid is stored in the first upper hydraulic cylinder 13. The other end of the first upper hydraulic cylinder 13 is coupled to a front right portion of car body (not shown). Also, a second line 112 is interconnected one end of the first upper hydraulic cylinder 13 and one end of a second upper hydraulic cylinder 14. One end of the second upper hydraulic cylinder 14 is coupled to a front left portion of the car body (not shown). Hydraulic fluid is stored in the second upper hydraulic cylinder 14. A third line 113 is interconnected the other end of the second upper hydraulic cylinder 14 and the other end of the first upper hydraulic cylinder 13. The second upper hydraulic cylinder 14 comprises an extended second piston 141 coupled to one end of a second lower pneumatic cylinder 15. The other end of the second lower pneumatic cylinder 15 is coupled to a front left wheel suspension device (see FIG. 2). A fourth line 114 is interconnected the other end of the second lower pneumatic cylinder 15 and the first valve 11.

In the invention, a fifth line 115 is interconnected the second valve 21 and a third lower pneumatic cylinder 16. One end of the third lower pneumatic cylinder 16 is coupled to a rear right wheel suspension device (see FIG. 2). The third lower pneumatic cylinder 16 comprises an extended third piston 161 coupled to a third upper hydraulic cylinder 17. Hydraulic fluid is stored in the third upper hydraulic cylinder 17. The other end of the third lower pneumatic cylinder 16 is coupled to a rear right portion of car body (not shown). Also, a sixth line 116 is interconnected one end of the third upper hydraulic cylinder 17 and one end of a fourth upper hydraulic cylinder 18. One end of the fourth upper hydraulic cylinder 18 is coupled to a rear left portion of the car body (not shown). Hydraulic fluid is stored in the fourth upper hydraulic cylinder 18. A seventh line 117 is interconnected the other end of the fourth upper hydraulic cylinder 18 and the other end of the third upper hydraulic cylinder 17. The fourth upper hydraulic cylinder 18 comprises an extended fourth piston 181 coupled to one end of a fourth lower pneumatic cylinder 19. The other end of the fourth lower pneumatic cylinder 19 is coupled to a rear left wheel suspension device (see FIG. 2). An eighth line 118 is interconnected the other end of the fourth lower pneumatic cylinder 19 and the second valve 21.

Configured as above, one ends of the first, the second, the third, and the fourth lower pneumatic cylinders 12, 15, 16, and 19 and all wheels are disposed in normal positions when a car is running on a straight road. In case that a car is making a turn a control device (not shown) is activated to cause the pneumatic conveyor (or electromagnetic device) 10 to activate. Next, output compressed gas (in the case of pneumatic conveyor) flows from the first and the second valves 11 and 21 to the first and the second lower pneumatic cylinders 12 and 15 and the third and the fourth lower pneumatic cylinders 16 and 19 via the first and the fourth lines 111 and 114 and the fifth and eighth lines 115 and 118 respectively. As such, pressure is built up in each of the first, the second, the third, and the fourth lower pneumatic cylinders 12, 15, 16, and 19. Hence, pressure of hydraulic fluid in each of the first, the second, the third, and the fourth upper hydraulic cylinders 13, 14, 17, and 18 is increased by compressed gas in each of the first, the second, the third, and the fourth lower pneumatic cylinders 12, 15, 16, and 19 respectively. The pressurized hydraulic fluid in each of the first, the second, the third, and the fourth upper hydraulic cylinders 13, 14, 17, and 18 flows to the first, the second, the third, and the fourth pistons 121, 141, 161, and 181 via the second, the third, the sixth, and the seventh lines 112, 113, 116, and 117 respectively. As a result, a restraint force among the first, the second, the third, and the fourth pistons 121, 141, 161, and 181 is generated. As an end, poor maneuverability of an inclined car due to centrifugal force when making a turn is greatly improved.

Figure 3:
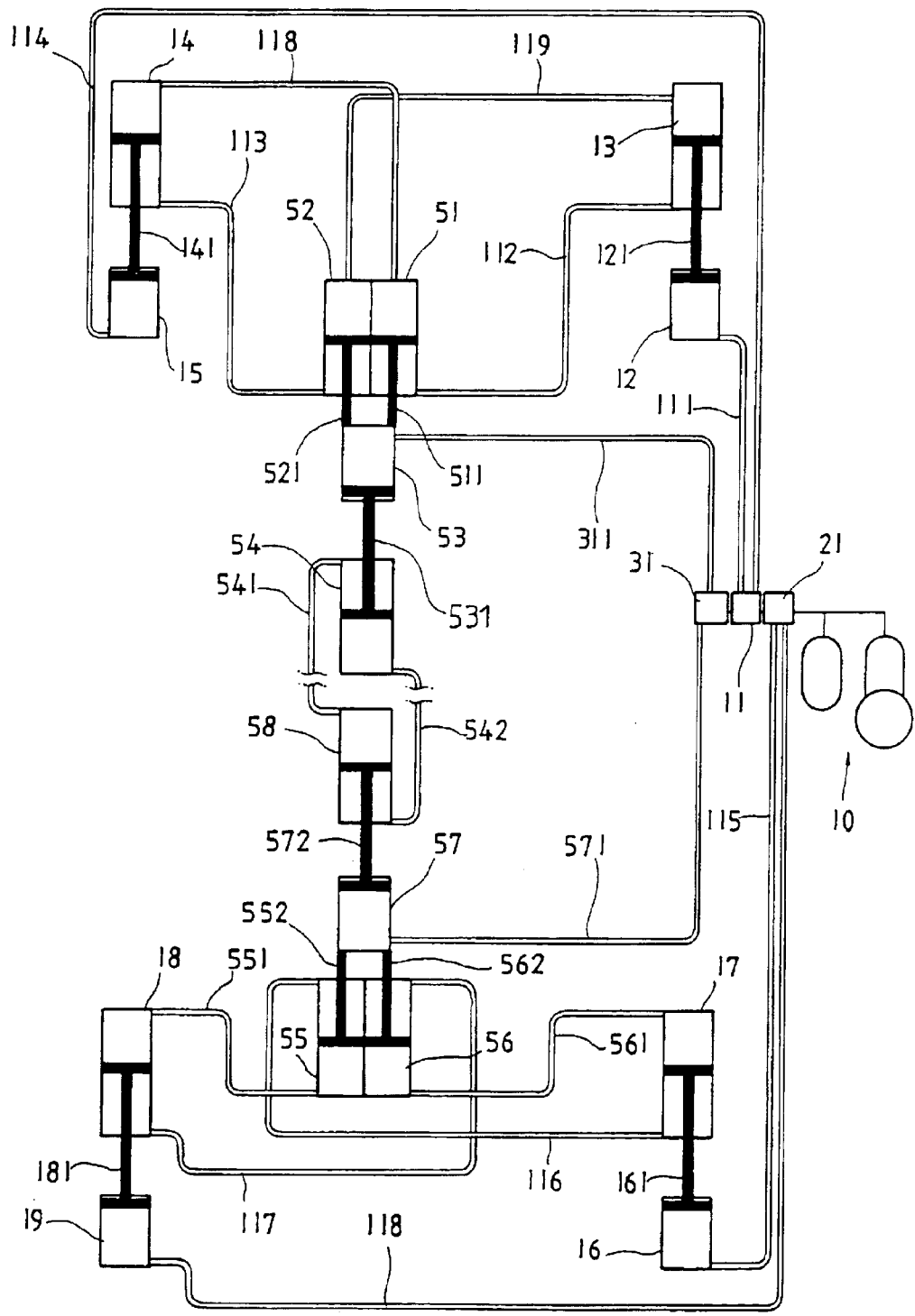
FIG. 3 schematically depicts a second system configuration according to the invention.

Referring to FIG. 3, there is shown a horizontal balance control system of motor vehicle in accordance with a second configuration of the invention. In the system, one end of a fifth hydraulic cylinder 51 is coupled to the second line 112. An eighth line 118 is interconnected the other end of the fifth hydraulic cylinder 51 and one end of the second upper hydraulic cylinder 14. The third line 113 is interconnected the other end of the second upper hydraulic cylinder 14 and one end of a sixth hydraulic cylinder 52. A ninth line 119 is interconnected the other end of the sixth hydraulic cylinder 52 and one end of the first upper hydraulic cylinder 13. The fifth and the sixth hydraulic cylinders 51 and 52 are arranged side by side. Hydraulic fluid is stored in each of the fifth and the sixth hydraulic cylinders 51 and 52. The fifth hydraulic cylinder 51 comprises an extended fifth piston 511 coupled to a seventh pneumatic cylinder 53 and the sixth hydraulic cylinder 52 comprises an extended sixth piston 521 coupled to the seventh pneumatic cylinder 53 respectively. A tenth line 311 is interconnected the seventh pneumatic cylinder 53 and a third valve 31. The third valve 31 is in turn coupled to one end of the pneumatic conveyor (or electromagnetic device) 10. Also, the seventh pneumatic cylinder 53 comprises an extended seventh piston 531 coupled to an eighth hydraulic cylinder 54. Hydraulic fluid is stored in the eighth hydraulic cylinder 54. An eleventh line 541 is extended from one end of the eighth hydraulic cylinder 54. A twelfth line 542 is extended from the other end of the eighth hydraulic cylinder 54.

In the invention, the sixth line 116 is coupled to one end of a ninth hydraulic cylinder 55. A thirteen line 551 is interconnected the other end of the ninth hydraulic cylinder 55 and one end of the fourth upper hydraulic cylinder 18. The seventh line 117 is interconnected the other end of the fourth upper hydraulic cylinder 18 and one end of of a tenth hydraulic cylinder 56. A fourteenth line 561 is interconnected the other end of the tenth hydraulic cylinder 56 and one end of the third upper hydraulic cylinder 17. The ninth and the tenth hydraulic cylinders 55 and 56 are arranged side by side. Hydraulic fluid is stored in each of the ninth and the tenth hydraulic cylinders 55 and 56. The ninth hydraulic cylinder 55 comprises an extended eighth piston 552 coupled to an eleventh pneumatic cylinder 57 and the tenth hydraulic cylinder 56 comprises an extended ninth piston 562 coupled to the eleventh pneumatic cylinder 57 respectively. A fifteenth line 571 is interconnected the eleventh pneumatic cylinder 57 and the other end of the third valve 31. The eleventh pneumatic cylinder 57 comprises an extended tenth piston 572 coupled to a twelfth hydraulic cylinder 58. Hydraulic fluid is stored in the twelfth hydraulic cylinder 58. Two ends of the twelfth hydraulic cylinder 58 are coupled to the eleventh line 541 and the twelfth line 542 respectively.

Configured as above, in a case that a car is braking or accelerating the control device is activated to cause the pneumatic conveyor (or electromagnetic device) 10 to activate. Next, output compressed gas (in the case of pneumatic conveyor) flows from the first and the second valves 11 and 21 to the first and the second lower pneumatic cylinders 12 and 15 and the third and the fourth lower pneumatic cylinders 16 and 19 via the first and the fourth lines 111 and 114 and the fifth and eighth lines 115 and 118 respectively. As such, pressure is built up in each of the first, the second, the third, and the fourth lower pneumatic cylinders 12, 15, 16, and 19. Hence, pressure of hydraulic fluid in each of the first, the second, the third, and the fourth upper hydraulic cylinders 13, 14, 17, and 18 is increased by compressed gas in each of the first, the second, the third, and the fourth lower pneumatic cylinders 12, 15, 16, and 19 respectively. The pressurized hydraulic fluid in each of the first, the second, the third, and the fourth upper hydraulic cylinders 13, 14, 17, and 18 flows to the first, the second, the third, and the fourth pistons 121, 141, 161, and 181 via the second, the third, the sixth, and the seventh lines 112, 113, 116, and 117 respectively. As a result, a restraint force among the first, the second, the third, and the fourth pistons 121, 141, 161, and 181 is generated. At the same time, the activated pneumatic conveyor (or electromagnetic device) 10 causes output compressed gas (in the case of pneumatic conveyor) to flow from the third valve 31 to the seventh and the eleventh pneumatic cylinders 53 and 57 via the tenth and the fifteenth lines 311 and 571 respectively. As such, pressure is built up in each of the seventh and the eleventh pneumatic cylinders 53 and 57. Hence, pressure of hydraulic fluid in each of the eighth and twelfth hydraulic cylinders 54 and 58 is increased by compressed gas in each of the seventh and the eleventh pneumatic cylinders 53 and 57 respectively. The pressurized hydraulic fluid in each of the eighth and twelfth hydraulic cylinders 54 and 58 flows to the seventh and the tenth pistons 531 and 572 via the eleventh and twelfth lines 541 and 542 respectively. As a result, a restraint force between the seventh and the tenth pistons 531 and 572 is generated. As an end, discomfort of driver and passenger(s) due to moving forward or backward while a car is braking or accelerating can be greatly improved.

Figure 4:
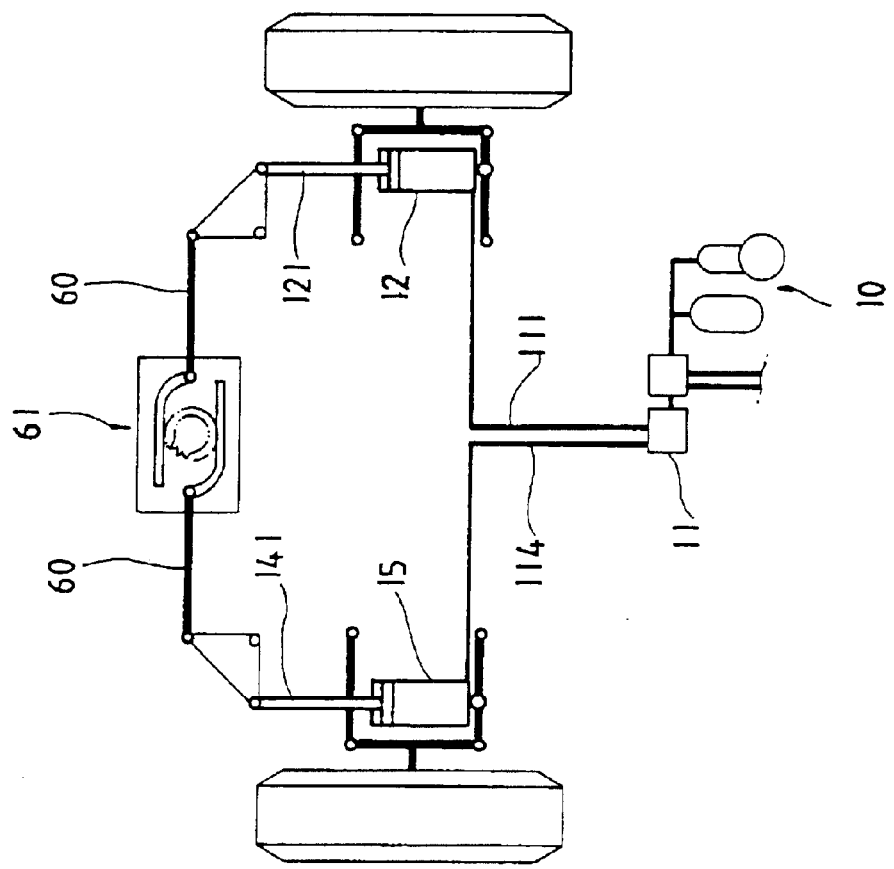
FIG. 4 schematically depicts a first preferred embodiment according to the invention.

Referring to FIG. 4, there is shown a first preferred embodiment according to the invention. A gearbox 61 is interconnected two links 60. Each link 60 is further coupled to either the first or the second piston 121 or 141. As such, the first and the second upper hydraulic cylinders 13 and 14 can be replaced by the above configuration. Similarly, a restraint force between the first and the second pistons 121 and 141 is generated. Likewise, in another configuration the gearbox 61 is interconnected both links 60. Each link 60 is further coupled to either the third or the fourth piston 161 or 181 (not shown). As such, the third and the fourth upper hydraulic cylinders 17 and 18 can be replaced by the above configuration. Similarly, a restraint force between the third and the fourth pistons 161 and 181 is generated.

Figure 5:
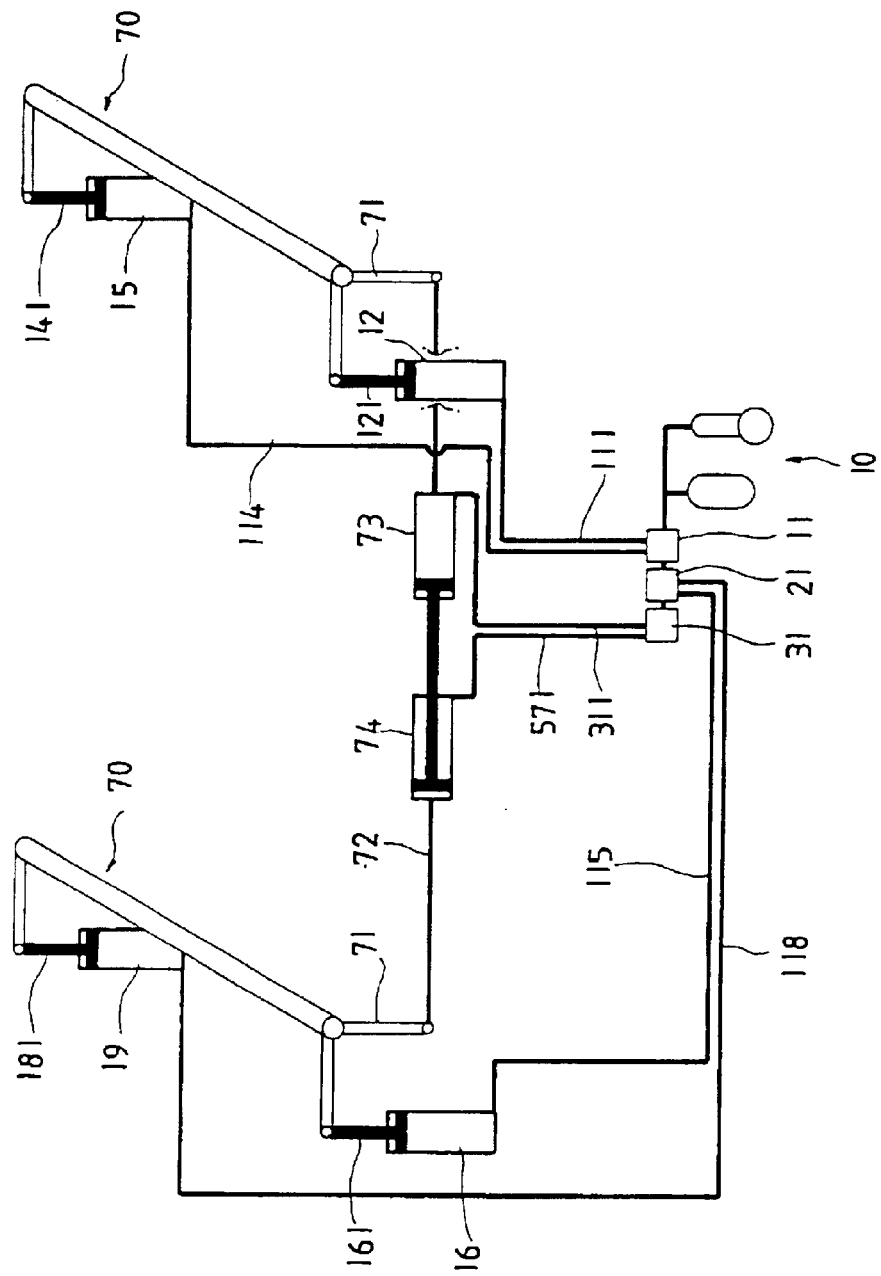
FIG. 5 schematically depicts a second preferred embodiment according to the invention.

Referring to FIG. 5, there is shown a second preferred embodiment according to the invention. Two ends of one U-shaped link 70 are coupled to the first and the second pistons 121 and 141 respectively. Two ends of another U-shaped link 70 are coupled to the third and the fourth pistons 161 and 181 respectively. A bar 71 is perpendicularly coupled to each of the U-shaped links 70. Another bar 72 is interconnected the other end of the bar 71 and a pair of aligned pneumatic cylinders 73 and 74. The third valve 31 is interconnected the pneumatic cylinders 73 and 74. As such, pressure is built up in each of the pneumatic cylinders 73 and 74. Compressed gas in each of the pneumatic cylinders 73 and 74 will activate another bar 72. Hence, a restraint force between the bars 71 is generated. As an end, discomfort of driver and passenger(s) due to moving forward or backward while a car is braking or accelerating can be greatly improved.

While the invention has been described by means of specific embodiments, numerous modifications and variations could be made thereto by those skilled in the art without departing from the scope and spirit of the invention set forth in the claims.

What is claimed is:

1. A horizontal balance control system of a motor vehicle, comprising:

pneumatic conveyor means mounted in a predetermined position of the motor vehicle, the pneumatic conveyor means comprising:

at least one first valve and a second valve at one end thereof, a first line interconnected the first valve and a first lower pneumatic cylinder, one end of the first lower pneumatic cylinder being coupled to either front or rear right wheel suspension means, the first lower pneumatic cylinder including an extended first piston coupled to first conveying means, a fourth line interconnected the first valve and one end of the second lower pneumatic cylinder, the other end of the second lower pneumatic cylinder being coupled to either front or rear left wheel suspension means, and an extended second piston coupled to the conveying means; and a fifth line interconnected the second valve and a third lower pneumatic cylinder, one end of the third lower pneumatic cylinder being coupled to either the rear or front right wheel suspension means, the third lower pneumatic cylinder including an extended third piston coupled to second conveying means, an eighth line interconnected the second valve and one end of a fourth lower pneumatic cylinder, the other end of the fourth lower pneumatic cylinder being coupled to either the rear or the front left wheel suspension means, and an extended fourth piston coupled to the second conveying means;

wherein the first conveying means comprises a first upper hydraulic cylinder coupled to the first piston, a second upper hydraulic cylinder coupled to the second piston, a second line interconnected one ends of the first and the second upper hydraulic cylinders, and a third line interconnected the other ends of the first and the second upper hydraulic cylinders;

the second conveying means comprises a third upper hydraulic cylinder coupled to the third piston, a fourth upper hydraulic cylinder coupled to the fourth piston, a sixth line interconnected one ends of the third and the fourth upper hydraulic cylinders, and a seventh line interconnected the other ends of the third and the fourth upper hydraulic cylinders; and further comprising control means operable to activate the pneumatic conveyor means for outputting compressed gas, the compressed gas being adapted to flow from the first and the second valves to increase pressure in the first, the second, the third, and the fourth pistons respectively for generating a restraint force among the first, the second, the third, and the fourth pistons, and thereby increasing maneuverability of the inclined motor vehicle due to centrifugal force when making a turn.

2. The horizontal balance control system of claim 1, wherein the pneumatic conveyor means is electromagnetic means.

3. The horizontal balance control system of claim 1, wherein the first conveying means comprises two links and a gearbox is interconnected the links, each of the links being coupled to either the first or the second piston for generating a restraint force between the first and the second pistons.

4. The horizontal balance control system of claim 1, wherein the second conveying means comprises two links and a gearbox is interconnected the links, each of the links being coupled to either the third or the fourth piston for generating a restraint force between the third and the fourth pistons.

5. The horizontal balance control system of claim 1, further comprising a fifth hydraulic cylinder having one end coupled to the second line, an eighth line interconnected to the other end of the fifth hydraulic cylinder and one end of the second upper hydraulic cylinder, a sixth hydraulic cylinder, a third line interconnected the other end of the second upper hydraulic cylinder and one end of the sixth hydraulic cylinder, a ninth line interconnected the other end of the sixth hydraulic cylinder and one end of the first upper hydraulic cylinder, the fifth and the sixth hydraulic cylinders being arranged side by side, the fifth hydraulic cylinder including an extended fifth piston, a seventh pneumatic cylinder coupled to the fifth piston, the sixth hydraulic cylinder including an extended sixth piston coupled to the seventh pneumatic cylinder, a tenth line coupled to the seventh pneumatic cylinder, a third valve having one end coupled to the tenth line and the other end coupled to one end of the pneumatic conveyor means, the seventh pneumatic cylinder including an extended seventh piston, an eighth hydraulic cylinder coupled to the seventh piston, an eleventh line extended from one end of the eighth hydraulic cylinder, a twelfth line extended from the other end of the eighth hydraulic cylinder, a ninth hydraulic cylinder having one end coupled to the sixth line, a thirteen line interconnected the other end of the ninth hydraulic cylinder and one end of the fourth upper hydraulic cylinder, a tenth hydraulic cylinder having one end coupled to the seventh line, the other end of the seventh line being coupled to the other end of the fourth upper hydraulic cylinder, a fourteenth line interconnected the other end of the tenth hydraulic cylinder and one end of the third upper hydraulic cylinder, the ninth and the tenth hydraulic cylinders being arranged side by side, the ninth hydraulic cylinder including an extended eighth piston, an eleventh pneumatic cylinder coupled to the eighth piston, the tenth hydraulic cylinder including an extended ninth piston coupled to the eleventh pneumatic cylinder, a fifteenth line interconnected the eleventh pneumatic cylinder and the other end of the third valve, the eleventh hydraulic cylinder including an extended tenth piston, and a twelfth hydraulic cylinder coupled to the tenth piston, the twelfth hydraulic cylinder having two ends coupled to the eleventh line and the twelfth line respectively, whereby discomfort of a driver and one or more passengers due to moving forward or backward while the motor vehicle is braking or accelerating is eliminated.

6. The horizontal balance control system of claim 5, further comprising a first U-shaped link having two ends coupled to the first and the second pistons respectively, a second U-shaped link having two ends coupled to the third and the fourth pistons respectively, a first bar perpendicularly coupled to each of the first and the second U-shaped links, a second bar having one end coupled to the other end of the first bar, and a pair of aligned pneumatic cylinder means coupled to the other end of the second bar, the third valve being interconnected the pneumatic cylinders means wherein pressure is increased in each of the pneumatic cylinder means for activating the second bar and generating a restraint force between the first and the second bars, and thereby eliminating discomfort of the driver and the one or more passengers due to moving forward or backward while the motor vehicle is braking or accelerating.

* * * * *